Nov. 7, 1939.  R. C. BENNER ET AL  2,178,773
SILICON CARBIDE AND MANUFACTURE THEREOF
Filed Nov. 13, 1935   3 Sheets-Sheet 1
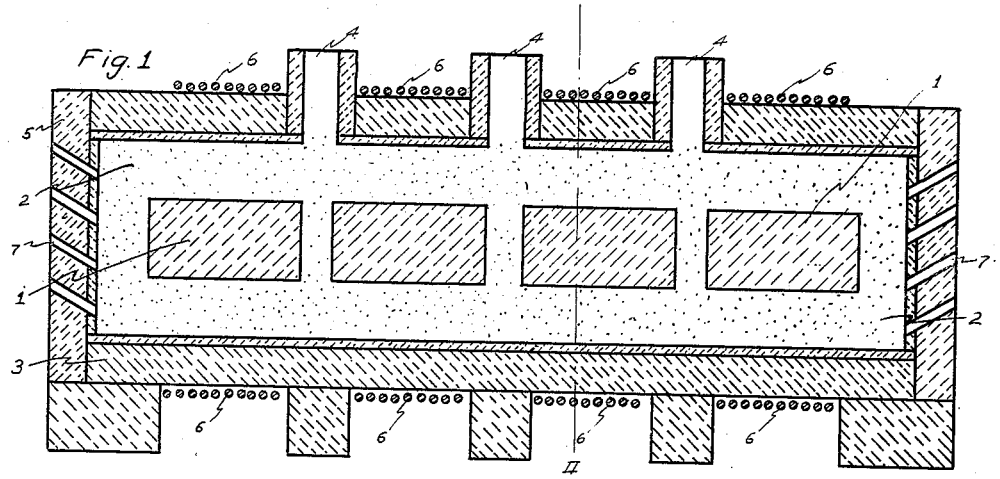
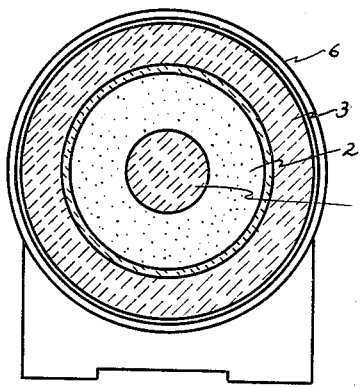
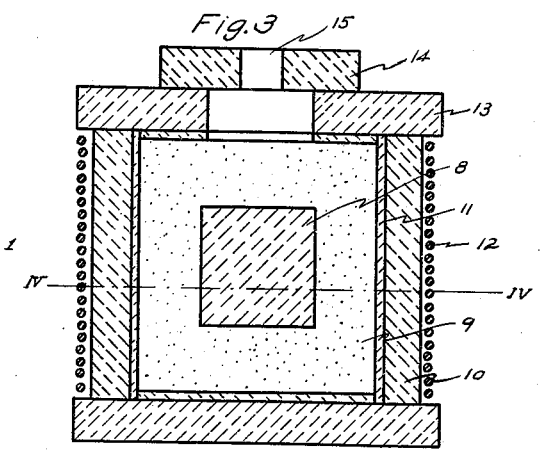
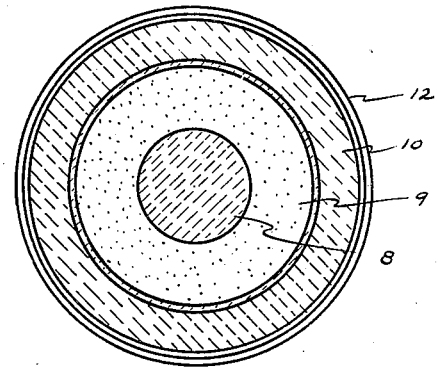
INVENTOR.
Raymond C. Benner
Romie L. Melton
John A. Boyer
BY
ATTORNEY.

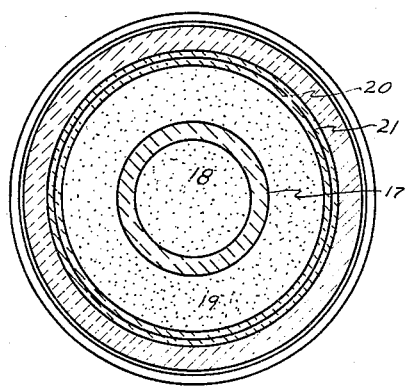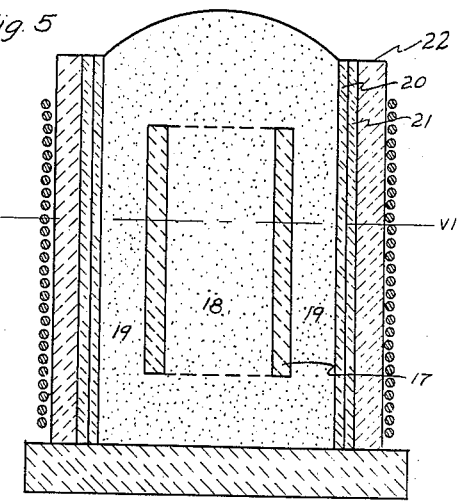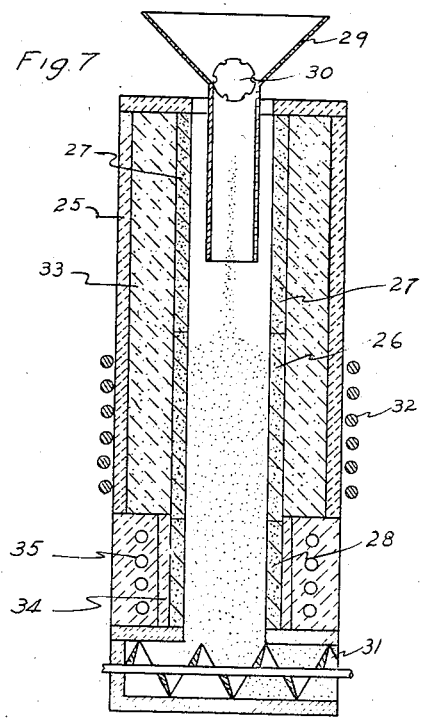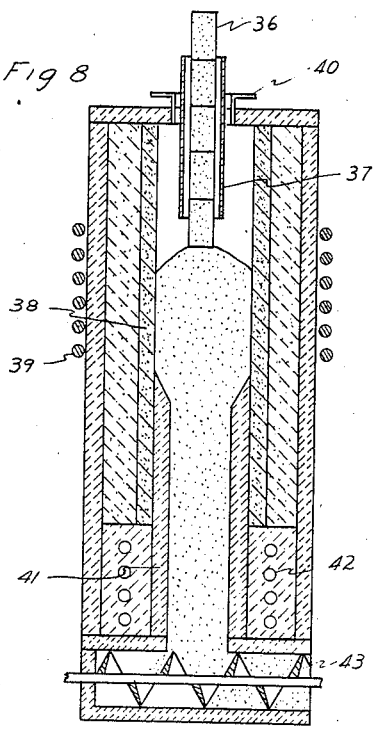

Nov. 7, 1939.  R. C. BENNER ET AL  2,178,773
SILICON CARBIDE AND MANUFACTURE THEREOF
Filed Nov. 13, 1935  3 Sheets-Sheet 3

INVENTOR.
Raymond C. Benner
Romie L. Melton
BY John A. Boyer
ATTORNEY.

Patented Nov. 7, 1939

2,178,773

UNITED STATES PATENT OFFICE 2,178,773

SILICON CARBIDE AND MANUFACTURE THEREOF

Raymond C. Benner, Romie L. Melton, and John A. Boyer, Niagara Falls, N. Y., assignors, by mesne assignments, to The Carborundum Company, Niagara Falls, N. Y., a corporation of Delaware Application November 13, 1935, Serial No. 49,518

9 Claims. (Cl. 23—208)

This invention relates to the manufacture of silicon carbide, and to a product produced by the interaction of sand and carbon under conditions not realized in the usual process of manufacture. The present application is a continuation in part of our copending applications, Serial No. 641,190, filed November 4, 1932, and Serial No. 659,784, filed March 6, 1933. In these applications a method of making silicon carbide was described in which a mixture of sand and carbon was heated to a substantially uniform temperature throughout its mass, and in which the reaction could be controlled so as to produce small individually separated crystals. The present application relates to this process and also to a crude furnace product comprising a comparatively pure form of silicon carbide having a cubic crystal structure. The present application is further concerned with a product in which the crystal units are characterized by an hexagonal structure, but in which the crystals are relatively small, and have not grown together into a coherent mass or "ingot".

The manufacture of silicon carbide requires an extremely high temperature, as for example, from 2000 to 2600° C., so that the usual types of electric furnace are not suited for its production. In the past a specially constructed furnace has been used, in which a mixture of sand and carbon is heated by means of a centrally positioned conducting core extending axially through the furnace, the core being buried within the mix. Owing to the small radiating surface of the core in comparison with the large amount of mix to be heated, the core must operate at a very high temperature, and this temperature is ordinarily above the decomposition temperature of silicon carbide. A portion of the silicon carbide formed adjacent the core is thus decomposed, while the outer portions of the mix, even at the completion of the process, are not heated greatly above room temperature. The final products include graphite, silicon carbide in widely varying crystal forms, "firesand" or siloxicon, partially converted mix, and a considerable proportion of raw mix in which no reaction has taken place. In a typical furnace, only about 30 per cent of the final product consists of crystalline silicon carbide suitable for abrasive purposes, and this material consists of an interlocking mass of crystals which show a great variation in both size and structure. Some of the crystals are flat, laminated plates of half an inch or more in width; others have a fibrous structure, and are so interlocked that they must be broken into large lumps with a sledge before crushing.

In our process, we heat a mixture of sand and carbon throughout its mass under controlled conditions, preferably by induction heating. In carrying out the process, we have found it possible to greatly increase the area of the resistor per unit volume of material to be heated, so that the resistor imparting heat to the mix can be operated at a much lower temperature than in the usual furnace, and at the same time dissipate an even greater quantity of heat to the mix. The resistor can thus be operated at temperatures well below the decomposition temperature of silicon carbide. with a considerably greater percentage conversion than in the usual type of furnace when the temperature of the resistor is above the decomposition temperature of silicon carbide.

With the process herein described, the character of the product is also changed, and a material containing small individually separated crystals, or loosely coherent aggregates of very minute crystals, can be produced. We have also found that with a control of the reaction temperature, a relatively pure modification of silicon carbide, differing in crystal structure from the usual hexagonal modifications, can be obtained. X-ray diffraction patterns indicate that the material is cubic. This cubic modification is produced at low temperatures, as for example, when the mix is heated uniformly to a temperature of from about 1700 to 1900° C. Since it is formed throughout the mixture of sand and carbon, it is not contaminated with segregated volatile impurities such as silica and lime, which vaporize and condense in the outer portions of the usual commercial furnace. With the usual grade of raw materials used for the manufacture of silicon carbide, a product containing more than 90 per cent silicon carbide, and usually about 95 per cent silicon carbide can be produced. With pure raw materials a product having a high degree of purity, as for example, from 98 to 99 per cent, can be obtained.

The crystal size of this cubic modification of silicon carbide can be controlled within considerable limits by varying the temperature, pressure and time relations during its manufacture. When the crystal size is very small, the material is a powder consisting of loosely coherent crystalline aggregates in which the crystals are of substantially uniform size. With prolonged heating, the crystal size can be increased, and the crystals, which are individually separated and are not grown together into a coherent mass, are suitable for many abrasive purposes without further treatment.

X-ray examination of the low temperature form of silicon carbide indicates that the principal lines of the diffraction pattern are those of a face centered cubic lattice. A typical sample gave a lattice constant of 4.363 Angstrom units. This value may vary somewhat with the quantity of impurities retained in solid solution, and may be as low as 4.35 Angstrom units. The diffraction pattern indicates that the structure may be of the zinc sulphide type, which is similar to the diamond lattice except that the two different kinds of atoms are not equivalent. If the temperature is properly controlled, as is possible in the case of induction heating, the powder diffraction pattern consists exclusively of the lines corresponding to the cubic structure (unless sufficient impurities are present to furnish additional lines). Upon heating to a higher temperature, however, a number of other lines appear, due to the conversion to another modification or modifications.

When heating the mixture to a temperature sufficient to convert the silicon carbide (or a substantial proportion of the material) to a hexagonal structure, the color of the material usually changes from green to black. With the controlled heating afforded by the induction process, (or with heating in which the resistor has a large radiating area per unit volume of material to be heated) hexagonal crystals can be produced which are small in size, as for example, less than from 2 to 5 millimeters in their greatest dimension, and which are individually separated. In many instances the crystals can be used for abrasive purposes without crushing, so that practically every particle is a true crystal with sharp crystal edges. With grain that must be crushed, the individual particles are irregular shaped crystal fragments, and do not possess true crystal faces.

In carrying out our process, a solid carbonaceous core can be embedded in the mix and the core heated by induction, or the material to be converted to silicon carbide can be passed continuously through a chamber or tunnel kiln type furnace. In both cases induction heating is desirable, since chamber type resistance furnaces operating at 2000° C. and above present a difficult problem. With induction heating, current can be induced into a carbonaceous conductor immediately adjoining the mix, without the necessity of employing heavy currents at low voltage, or bringing external terminals or connections through the highly heated mix to the external parts of the furnace. With such a procedure large volumes of material can be heated to high temperatures with a resistor area which would be practically the equivalent of a short circuit if employed in the usual type of resistance furnace. The resistor may be operated at a temperature of from 1800 to 2200° C. with a power input which would raise the temperature of the core of the usual resistance furnace to 2600° C. or above.

Several methods of carrying out our invention are illustrated in the accompanying drawings.

In the drawings—

Figure 1 is a sectional view of a silicon carbide furnace employing several inductively heated cores;

Figure 2 is a section of the furnace shown in Figure 1, the section being taken along the line II—II;

Figure 3 is a cylindrical furnace, the axis of the furnace being vertical;

Figure 4 is a section of the furnace shown in Figure 3, the section being taken along the line IV—IV;

Figure 5 is a sectional view of a vertical furnace employing a hollow cylindrical conductor;

Figure 6 is a section of the furnace shown in Figure 5, the section being taken along the line VI—VI;

Figure 7 shows a section of a vertical furnace in which the loose sand-carbon mix is introduced directly into the reaction zone of the furnace, and in which a portion of the lining of the furnace is heated by electrical induction;

Figure 8 shows a section of a vertical furnace similar to that shown in Figure 7, but in which the sand-carbon mix is introduced into the reaction zone in the form of briquetted blocks;

Figure 9:
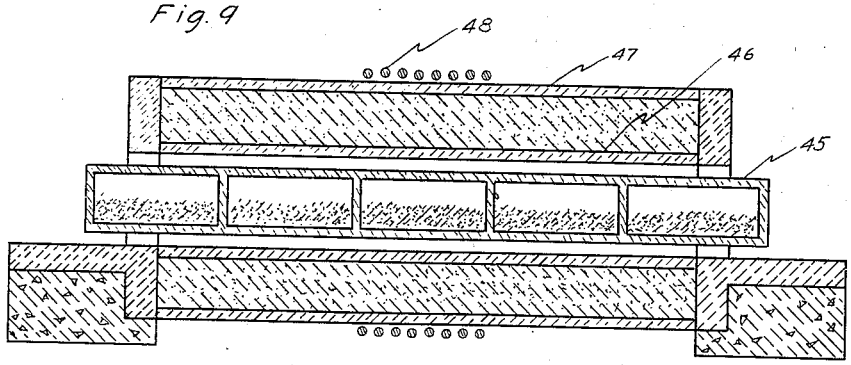
Figure 9 shows a section of a horizontal furnace in which the mix is placed within a series of containers and the containers heated by electrical induction.

The furnace shown in Figures 1 and 2 illustrates diagrammatically the application of inductive heating to a furnace of the same general type as that used for the manufacture of silicon carbide by the resistance heating process. In the resistance furnace, however, the conducting core of the furnace must be of considerable length and relatively small cross section, and must be continuous throughout the length of the furnace. The core is ordinarily made from loose granular material to give a high specific resistance, and to avoid the difficulty which would be encountered in joining solid carbon pieces into a core of great length. In the induction furnace shown in Figures 1 and 2, the cores can be of short length and of any diameter desired, as their dimensions are no longer determined by their resistance to the flow of current. If desired, the diameter of the core can be approximately half the diameter of the furnace chamber, with a consequent decrease in operating temperature of the core for a given power input. Solid carbon cores can be used, since no joints are necessary, and the loosely embedded blocks I can be separated from each other by a considerable distance, as it is unnecessary to provide a continuous longitudinal path through the furnace for the electric current.

The higher the electrical conductivity and the larger the diameter of the resistors in the induction furnace, the more efficient is the transfer of electrical energy from the surrounding coils, so that the low electrical resistance of a solid core of large cross section, which makes such a core impractical in a resistance furnace, is turned to actual advantage in the production of silicon carbide by the induction process.

Considering Figures 1 and 2 in detail, the conducting material I is composed of blocks or cylinders of carbon or graphite, which can be hollow or solid as desired. The sand-carbon mix 2 is contained in a refractory casing or cylinder 3 provided with vents 4 to permit the escape of gases formed during the reaction between the sand and carbon. The refractory casing 3 can be lined with silicon carbide if desired, and may be constructed in sections so as to facilitate the dismantling of the furnace and the removal of its contents. The end walls 5 are provided with openings to permit the escape of gases. The induction coils are designated by 6, and are positioned outside the furnace in such a manner as to be coaxial with the cores 1. These coils are connected to a suitable source of alternating current, the optimum frequency of which will depend upon the diameter cores, as will be further discussed.

The furnace shown in Figures 3 and 4 utilizes to a further extent the possibility of greatly shortening the core and of increasing its diameter. By heating the core 8 by induction, it is possible to proportion the core so as to have a diameter as great or greater than its height. Such a procedure would be impossible with the usual form of resistance heating. The sand-carbon mix 9 receives a substantial proportion of its heat from the top and bottom of the core, in addition to that dissipated from the cylindrical surface. The induction coil 12 is placed outside the furnace and is coaxial with the cylindrical core 8. The top 13 can be detachable so as to facilitate the removal of the contents of the furnace and the cover 14 is provided with a vent 15 for the escape of gases. The interior of the casing 10 is lined with a highly heat resisting refractory, as for example silicon carbide.

The degree of conversion of the sand carbon mix to crystalline silicon carbide depends almost entirely upon the uniformity of heating throughout the mix. The range of temperatures in which silicon carbide can be formed is comparatively narrow; if the mix is not heated to the reaction temperature throughout its mass, conversion is incomplete, whereas if any proportion of the mix is heated substantially above the temperature at which suitable crystals are produced, the silicon carbide formed will be decomposed to form silicon vapor and graphite. With the great decrease in temperature gradient made possible by induction heating, the degree of conversion to crystalline material suitable for abrasives can be greatly increased, in addition to the control of the character of the product as previously described.

The furnace shown in Figures 5 and 6 still further decreases the temperature gradient through the furnace mix during the formation of the silicon carbide, by employing conductors of larger diameter. Such a furnace possesses another advantage, in that heating can be effected by induced currents of lower frequencies. In a furnace in which there is a fairly close coupling between the induction coil and the conductor, the frequency necessary for effective heating decreases rapidly as the diameter of the conductor is increased. While furnaces having a core of small diameter should be heated by a current of comparatively high frequency (as for example, from approximately 500 to 30,000 cycles or greater, depending on the design of the furnace), we have found that in a furnace employing a conductor of large diameter the frequency can be reduced, and in some instances it is even possible to come within the range of the usual commercial sources of power, as for example 25 to 60 cycles. This reduction in frequency possesses many advantages, since it eliminates the necessity of high frequency generators or other expensive methods of producing a high frequency current. Furthermore, the depth of penetration of the induced current into the carbon or graphite conductor is much greater with a low frequency current than with a high frequency current, and as the frequency becomes very high the induced current is generated merely within a surface layer of the conductor, and must depend upon thermal conductivity for uniform distribution of temperature throughout the conductor. Furnaces in which cylindrical conductors of very large diameter can be used, and which can be operated on commercial frequencies if a suitable diameter ratio between the coil and the conductor is maintained will be further described.

In the furnace shown in Figures 5 and 6 an electric current is induced in a hollow cylinder 17 of carbon or graphite. At equilibrium conditions the temperature gradient through the mix 18 within the conducting cylinder is zero, and owing to the reduced distance between the conducting cylinder and the outer casing, the thermal drop through the outer portion 19 of the mix is comparatively slight. The refractory lining 20 can be composed of silicon carbide, and a thin layer of lamp black or other powdered insulating material 21 can be interposed between the highly heated lining and the refractory casing 22. The conducting cylinder 17 can be in the form of a crucible or closed container if desired, providing proper vents are provided for the escape of gases.

In the operation of furnaces employing a solid carbon or graphite conductor, the conducting material can be protected from the action of the sand carbon mix by coating the conductor with a slurry composed of powdered graphite suspended in water so as to form a paste. A small quantity of sodium silicate or other agglutinant may be added to the slurry if desired. After the coating is dried it forms a porous protective layer of graphite separating the sand carbon mix from the solid conductors.

In carrying out the manufacture of silicon carbide by the methods above described, the usual silicon carbide furnace mix consisting of sand, carbon, sawdust (or other forms of wood) and salt can be used. Such a mixture usually contains sand and carbon in approximately the proportion of 60 percent sand to 40 percent carbon, the sawdust and salt being added as minor ingredients. We have found, however, that when the mix is heated very uniformly to the conversion temperature by a resistor operating below the decomposition temperature of silicon carbide, a mix more closely approximating the stoichiometric proportions can be used. The theoretical ratio for the silicon carbide reaction is 62½ percent silica to 37½ percent carbon. The addition of sawdust and salt is not absolutely essential, but is desirable, the sawdust being especially useful in permitting the escape of gases through the mix. Approximately 8 percent of sawdust and 2 percent of salt can be used, correction being made for the fixed carbon content of the added wood.

The mix is placed in the furnace and heated by current induced in the carbonaceous conductors as previously described. The most advantageous frequency, the power required, and the time of heating will vary with the particular furnace, and the proper power input can readily be determined by trial. The heat is generated entirely within the furnace, the induction coil operating approximately at room temperature.

If it is desired to carry out our process continuously, furnaces of the type illustrated in Figures 7, 8, 9, and 10 can be used. The furnaces shown in these figures overcome certain difficulties which are encountered in attempting to pass a mixture of sand and carbon through a furnace chamber heated to a temperature sufficient to cause the formation of silicon carbide.

In the reaction between sand and carbon, the silica usually fuses before reaction takes place, and the entire mass has a tendency to "cake" or sinter together. If it is attempted to pass a continuous column of mix through a tubular furnace having a highly heated central portion, the caking of the mix in the lower temperature zone before reaction is complete presents a serious difficulty, for it not only prevents free movement of the mix, but also makes the escape of gases very difficult. A large amount of carbon monoxide is evolved as a result of the reaction between sand and carbon, and if the gas is confined, explosion or disruption of the furnace may result. These difficulties can be overcome by introducing the mix directly into the hot zone of the furnace as indicated in Figures 7 and 8. In these furnaces, the reacting mix can be introduced rather slowly so that only a thin layer or small portion will be undergoing reaction at a given time, and an open space is provided above the reacting mix for the escape of the gases formed during the reaction. Oxidizing gases should be kept from the reaction chamber, as the silicon vapor and the finely divided silicon carbide formed during the reaction are readily oxidized.

Referring to Figure 7 in detail, the furnace comprises a vertical column, the upper part of which is contained in an outer casing 25 of electrically insulating refractory material. The lining of the furnace is divided into three sections, the central portion 26 being composed of carbon or graphite and being the portion heated by electrically induced current. This section forms the "hot zone" of the furnace. The remaining sections 27 and 28 of the lining can be composed of carbon or graphite, or can be constructed of recrystallized silicon carbide. If desired, an inner lining of recrystallized silicon carbide can be placed between the graphite resistor 26 and the mix undergoing reaction. Such a lining has the advantage that it is resistant to abrasion and is not acted upon by the vapors generated within the furnace, and at the same time is stable up to the decomposition temperature of silicon carbide. A very desirable form of construction is one in which the sections 27 and 28 are composed of recrystallized silicon carbide, and the section 26 comprises a composite wall consisting of an outer ring of graphite and an inner lining of silicon carbide.

The sections 27 and 28 should be separated from the conducting portion 26 of the lining into which the current is induced, either by a suitable spacing or by a layer of silicon carbide cement, so as to provide additional thermal drop between the hot zone and the end portions of the furnace.

In the operation of the furnace, the entire lower portion is filled with non-reactive material such as crushed granular coke. After the furnace has reached the proper temperature, the sand carbon mix is introduced into the hopper 29 and is added slowly by means of the distributing member 30 to the top surface of the coke, which has already become heated to the temperature necessary to form silicon carbide. The coke is removed from the bottom of the furnace by means of the screw conveyor 31, the rate of addition of the raw mix and the removal of the coke and finally the silicon carbide from the lower portion of the furnace being adjusted so that the stop level of the mix is always within the hot zone of the furnace. The rate of addition and removal can be adjusted so that only a relatively small proportion of the column of mix within the furnace is undergoing reaction to liberate carbon monoxide at a given time, and as the space above the hot zone is open and not filled with mix, the gases have ample opportunity to escape, and can be burned at the top of the furnace or collected and utilized as desired.

The section 26 of the lining is heated by current induced into it from the coil 32, which is connected to a suitable source of alternating current, preferably of a frequency somewhat greater than the usual commercial sources of current supply. A current of, for example, from 500 to several thousand cycles has been found satisfactory. The exact frequency giving the highest efficiency will depend upon the size and design of the particular furnace, and for small installations it may be desirable to use a frequency as high as 50,000 cycles or greater. The number of turns and design of the coil 32 will also depend somewhat upon the diameter of the furnace, and upon the voltage available for the high frequency source of current and other factors, so that in the drawings the induction coils are represented diagrammatically, whereas in actual practice a coil having a large number of turns may be desirable or necessary. The coils are preferably hollow so that they can be water cooled. The lining 26 functions in much the same manner as a single turn secondary of a transformer, and when a high frequency current of relativey high voltage is applied to the outer coil, a current of low voltage and relatively high amperage is induced into the conducting lining.

For the manufacture of silicon carbide of the low temperature or cubic variety, the hot zone of the furnace should be operated at temperature of less than about 2000° C.; for the hexagonal modifications a somewhat higher temperature should be used. The temperature should be kept sufficiently low so as to prevent recrystallization of the silicon carbide into a solid mass. A satisfactory power input for a given rate of movement of the mix through the furnace can be determined by trial without the necessity of directly measuring the temperature.

The lining of the furnace is thermally insulated from the outer casing 25 by a layer 33 of powdered carbon such as lampblack, or by other suitable high temperature insulating material. The lower part of the furnace lining is backed by a layer 34 of recrystallized silicon carbide, and the entire lower portion of the furnace can be water cooled if desired by means of the water pipes 35.

In the operation of the furnace, the mix is introduced directly into the hot zone of the furnace and does not come into contact with the side walls of the furnace until the hot zone is reached. Fusion of the silica at a temperature insufficient to produce silicon carbide is thus prevented. In the reaction zone of the furnace the silica at first fuses, but as the reaction between the sand and carbon proceeds there is a large contraction in volume, and the material is converted into a crumbly greenish mass which does not appear crystalline upon visual examination, but which is really a micro-crystalline material and as the mass gradually passes downward through the furnace it is converted to crystals of silicon carbide of visible size. These crystals at first are very small, but grow considerably if subjected to the action of the hot zone of the furnace for any appreciable time. If large crystals are desired, a fairly long furnace chamber should be used to provide sufficient movement of the mass to prevent recrystallization of the material into a solid body. For many abrasive purposes, however, small uniform sized crystals are preferable to the large crystals commonly formed in the usual furnace and these small crystals can be formed by exposure of the mix to the high temperature zone for a time which is sufficient merely to provide a uniform temperature gradient throughout the mix.

In introducing the mix into the furnace, care should be taken to avoid too great a degree of subdivision unless the particles are subsequently bonded into granules or small lumps as the fine carbon dust may be explosive if any air remains in the furnace. The mix is preferably pulverized, wet with water or a temporary binder, dried, and the resulting cake granulated or disintegrated into lumps or aggregates.

In the furnace shown in Figure 8, the sand carbon mix is briquetted into blocks 36 which are introduced into the hot zone of the furnace through the tube 37 which can be made of carbon, recrystallized silicon carbide, or other suitable material. The furnace is of similar construction to that shown in Figure 7. The heating current is induced into the carbon lining 38 by a high frequency current passed through the coil 39. The space above the reacting mix is open and permits the escape of the carbon monoxide formed during the reaction. The gas can be collected through the outlets 40 or can be burned at the top part of the furnace. If desired, the incoming briquettes can be preheated by the combustion of the gas produced during the sand carbon reaction. Similar preheating can also be effected in the case of the loose mix used in the furnace shown in Figure 7.

The inner lining 41 of the lower part of the furnace shown in Figure 8 can be of recrystallized silicon carbide. The lower part of the furnace can be watercooled by means of the water pipes 42 if it is desired to shorten the cooling zone before the mix reaches the screw conveyor 43.

In the furnace shown in Figure 9, the sand carbon mix is placed in a series of graphite containers 45 which are passed through a tubular furnace comprising an inner wall 46, preferably made of recrystallized silicon carbide and an outer casing 47 of electrically insulating refractory material. The inner and outer walls of the furnace are separated by lampblack or other suitable thermal insulation. A high frequency alternating current is passed through the coil 48, and as the containers reach the field of the high frequency coil, a current is induced in them and they become heated to a very high temperature. The upper portions of the containers are provided with holes for the escape of gases. If it is not desired to heat the containers by induction, a conductive lining of graphite can be placed in the central zone of the furnace, or a ring of graphite can be placed immediately outside the silicon carbide lining and the heating current induced within the graphite ring.

Figure 10:
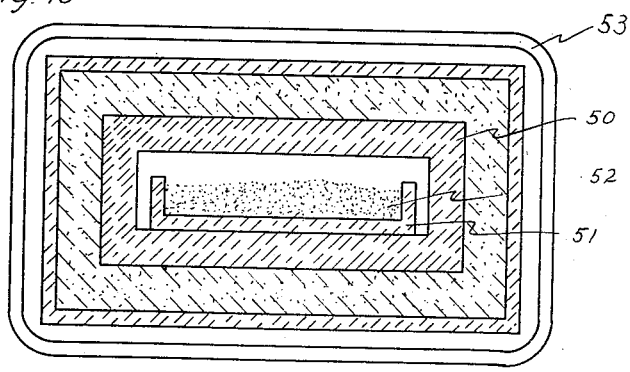
Figure 10 illustrates diagrammatically a type of furnace in which the mix is spread into a thin layer in order to assure rapid transfer of heat throughout the mixture.

As a further modification of the furnace shown in Figure 9, the cross section of the furnace can be made approximately rectangular, and of such a shape that the width of the furnace chamber considerably exceeds its height, as indicated diagrammatically in Figure 10. This permits the mix to be spread out on a shallow trough or container. One of the difficulties in carrying out the continuous process is to secure rapid transfer of heat through the finely divided mix, but when the mix is spread out in a comparatively thin layer, the transfer can be rapidly effected. In Figure 10, the conducting material 50 into which the current is induced constitutes a rectangular shell of carbon or graphite; the container 51 is also of carbon, and the sand carbon mix 52 forms a thin layer through which the heat can readily penetrate. The chamber is surrounded by an induction coil 53. If desired, the container itself can be heated directly by induction, or the mix can be passed underneath a highly heated slab or resistor.

While we have indicated that the raw materials used in carrying out our process are silica and carbon, we may use a partially converted mixture which has been previously heated to a lower temperature, and secure the final high temperature required to produce recrystallized silicon carbide by passing the partially converted or incompletely crystallized mixture through the types of furnace herein described. This procedure is especially advantageous in connection with the furnace shown in Figure 8, where the briquettes can be heated to a temperature sufficient to cause sintering or incipient reaction and then introduced directly into the hot zone of a high temperature furnace.

In heating a mixture of sand and carbon to form silicon carbide, it has previously been assumed that the silicon carbide crystals were formed by reaction of vapors within the furnace, and that when the reaction was carried to completion, large hexagonal crystals inevitably result. In heating by induction we have found however, that the silicon carbide reaction can be completed before the hexagonal crystals are formed, and that by a proper control of time and temperature relations, the various crystal modifications can be completely or partially separated.

In the appended claims, we define an X-ray diffraction pattern as consisting of interference maxima, which in the powder method of X-ray analysis consist of lines on the photographic film or plate. The methods of obtaining these patterns and the types of pattern produced with various methods are, of course, well known to one skilled in this art.

By the term "crude furnace product" we mean the product as it is taken from the furnace, without subsequent purification or other treatment.

Having thus described our invention, we claim:

1. The method of making silicon carbide which comprises passing a mixture of silica and carbon through a hollow carbonaceous conductor, heating the conductor to at least the temperature of formation of silicon carbide by electrically inducing a current therein, causing relative movement of the sand carbon mixture with respect to the said conductor, heating the sand carbon mixture uniformly throughout its mass, causing a substantially continuous movement of the formed silicon carbide within the furnace to prevent recrystallization into a coherent mass of interlocking crystals, and removing the reaction product of the sand and carbon from the vicinity of the conductor after the said mixture has been converted to silicon carbide.

2. The method of making silicon carbide which comprises briquetting a mixture of sand and carbon, passing the briquettes so formed into a highly heated furnace chamber of larger cross-sectional area than that of the briquettes, maintaining a free space between the said briquettes and the side walls of the furnace chamber until a zone is reached which is sufficient to cause an interaction of the sand and carbon to form silicon carbide, and removing the silicon carbide so formed from another part of the furnace.

3. The method of making silicon carbide which comprises continuously passing a mixture of sand and carbon through a tubular furnace chamber, the central portion of which is heated to at least the temperature of formation of silicon carbide, and maintaining the said mixture out of contact from the walls of the furnace in the cooler portions of the furnace chamber, whereby the said mixture is prevented from sticking.

4. The method of making silicon carbide which comprises passing a sand carbon mixture through a tubular furnace chamber, a portion of which is heated to at least the temperature of formation of silicon carbide, introducing the mix directly into the highly heated zone of the furnace at a rate sufficiently slow to produce an interaction between only a small quantity of the sand and carbon at a given time, maintaining the said mixture out of contact from the walls of the furnace in the cooler portions of the furnace chamber, whereby the said mixture is prevented from sticking, and maintaining a volume free from mix above the reacting mix to permit the escape of gases.

5. The method of making silicon carbide by a continuous process which comprises introducing a mixture of silica and carbon into a series of refractory containers, passing the said containers through a hollow inductively heated furnace and heating the mixture within the containers to a substantially uniform temperature throughout the said mixture by inductively generated heat, the said temperature being sufficient to convert the mixture of silica and carbon to silicon carbide.

6. The method of making silicon carbide by a continuous process which comprises introducing a mixture of silicon and carbon into a series of hollow carbonaceous containers, passing the containers through a rapidly alternating electric field, inducing a current in the said containers by means of the said field, and heating the containers to the temperature of formation of silicon carbide by the current induced from the said field.

7. As a new article of manufacture, a crude furnace product composed of individually separated crystals of silicon carbide which are individually and separately developed and substantially free from faces produced by artificial fracture.

8. As a new article of manufacture, microcrystalline silicon carbide composed of individually separated crystals which are individually and separately developed and substantially free from faces produced by artificial fracture.

9. A crude furnace abrasive product consisting of silicon carbide crystals which are individually and separately developed and substantially free from faces produced by artificial fracture, said crystals giving an X-ray diffraction pattern characteristic of a cubic crystal structure.

RAYMOND C. BENNER.
ROMIE L. MELTON.
JOHN A. BOYER.